US007143410B1

(12) United States Patent
Coffman et al.

(10) Patent No.: US 7,143,410 B1
(45) Date of Patent: Nov. 28, 2006

(54) SYNCHRONIZATION MECHANISM AND METHOD FOR SYNCHRONIZING MULTIPLE THREADS WITH A SINGLE THREAD

(75) Inventors: Jerrie L. Coffman, Beaverton, OR (US); Mark S. Hefty, Aloha, OR (US); Fabian S. Tillier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,624

(22) Filed: Mar. 31, 2000

(51) Int. Cl.
*G06F 9/00* (2006.01)
(52) U.S. Cl. ..................... 718/100; 718/102
(58) Field of Classification Search ............... 709/100, 709/102, 104, 106–108, 200–203, 248; 707/8; 717/114–120; 718/100, 102, 104, 106–107
See application file for complete search history.

(56) References Cited

U.S. PATENT DOCUMENTS

| 4,435,766 | A | * | 3/1984 | Haber et al. | 710/200 |
|---|---|---|---|---|---|
| 5,179,702 | A | * | 1/1993 | Spix et al. | 709/102 |
| 5,319,782 | A | * | 6/1994 | Goldberg et al. | 709/104 |
| 5,404,488 | A | * | 4/1995 | Kerrigan et al. | 711/133 |
| 5,797,004 | A | * | 8/1998 | Lindholm et al. | 709/104 |
| 5,835,763 | A | * | 11/1998 | Klein | 709/101 |
| 6,026,427 | A | * | 2/2000 | Nishihara et al. | 709/106 |
| 6,029,190 | A | * | 2/2000 | Oliver | 718/107 |
| 6,035,321 | A | * | 3/2000 | Mays | 709/103 |
| 6,134,579 | A | * | 10/2000 | Tavallaei et al. | 709/100 |
| 6,243,107 | B1 | * | 6/2001 | Valtin et al. | 345/506 |
| 6,272,625 | B1 | * | 8/2001 | deCarmo | 712/245 |
| 6,421,742 | B1 | * | 7/2002 | Tillier | 710/1 |
| 6,463,527 | B1 | * | 10/2002 | Vishkin | 712/245 |
| 6,466,898 | B1 | * | 10/2002 | Chan | 703/17 |
| 6,598,068 | B1 | * | 7/2003 | Clark | 718/104 |
| 6,622,155 | B1 | * | 9/2003 | Haddon et al. | 718/100 |
| 6,697,834 | B1 | * | 2/2004 | Dice | 718/102 |

* cited by examiner

*Primary Examiner*—Chun Cao
(74) *Attorney, Agent, or Firm*—Rob D. Anderson

(57) ABSTRACT

A host system is provided with a shared resource (such as work queues and completion queues); multiple processors arranged to access the shared resource; and an operating system arranged to allow multiple processors to perform work on the shared resource concurrently while supporting updates of the shared resource. Such an operating system may comprise a synchronization algorithm for synchronizing multiple threads of operation with a single thread so as to achieve mutual exclusion between multiple threads performing work on the shared resource and a single thread updating or changing the state of the shared resource without requiring serialization of all threads.

21 Claims, 6 Drawing Sheets

Worker Thread Operation

Update Thread Operation

EXAMPLE SOFTWARE DRIVER STACKS FOR HOST SYSTEM

Worker Thread Operation

Update Thread Operation

SYNCHRONIZATION MECHANISM AND METHOD FOR SYNCHRONIZING MULTIPLE THREADS WITH A SINGLE THREAD

TECHNICAL FIELD

The present invention relates to a data network, and more particularly, relates to a a mechanism and method for synchronizing multiple threads of operation with a single thread of operation in such a data network.

BACKGROUND

A data network is generally consisted of a network of nodes connected by point-to-point links. Each physical link may support a number of logical point-to-point channels. Each channel may be a bi-directional communication path for allowing commands and message data to flow between two connect nodes within the data network. Each channel may refer to a single point-to-point connection where message data may be transferred between two endpoints or systems. Data may be transmitted in packets including groups called cells from source to destination often through intermediate nodes.

In many data networks, hardware and software may often be used to support asynchronous data transfers between two memory regions, often on different systems. Each system may correspond to a multi-processor system including one or more processors. Each system may serve as a source (initiator) system which initiates a message data transfer (message send operation) or a target system of a message passing operation (message receive operation). Examples of such a multi-processor system may include host servers providing a variety of applications or services, and I/O units providing storage oriented and network oriented IO services. Requests for work (I/O operations) may be posted to shared resources (such as work queues and other memory elements associated with a given hardware adapter), the requested operation may then be performed. However, it is the responsibility of the system which initiates such a request to insure that a shared resource is in an appropriate state to do the work.

In order to improve the performance capabilities of software drivers on a multi-processor system, multiple threads of operation can concurrently initiate new work (I/O operations) and process completed work (I/O operations) on shared resources. The threads initiating and completing work (I/O operations) check the state of a shared resource before performing any work. Events such as descriptor errors, or a user request can cause a shared resource to change states. Therefore care must be taken when changing the state of a shared resource in order to prevent threads initiating and completing work (I/O operations) from performing work (I/O operations) on the shared resource in an invalid state. Furthermore, any thread wishing to update or change the state of a shared resource must be synchronized with all the threads processing work (I/O operations) in order to maintain state integrity. Moreover, shared resources that may be simultaneously accessed by multiple threads can still be compromised if not protected. Mutual exclusion locks have been used to resolve conflict of concurrent access requests of multiple threads in which any one thread may hold the lock while other threads trying to acquire the same lock may be blocked until the lock is available. However, mutual exclusion locks are not suitable for synchronizing multiple threads with a single thread since such a lock forces strict serialization of all the threads—only a single thread can run at any given time. Therefore, there is a need for a mechanism to synchronize multiple threads of operation with a single thread of control and achieve mutual exclusion between multiple threads processing work (I/O operations) on a shared resource and a single thread updating or changing the state of a shared resource without requiring strict serialization of all threads.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

The present invention is applicable for use with all types of computer networks, I/O hardware adapters and chipsets, including follow-on chip designs which link together end stations such as computers, servers, peripherals, storage devices, and communication devices for data communications. Examples of such computer networks may include local area networks (LANs), wide area networks (WANs), campus area networks (CANs), metropolitan area networks (MANs), global area networks (GANs), wireless personal area networks (WPANs), and system area networks (SANs), including newly developed computer networks using Next Generation I/O (NGIO), Future I/O (FIO), System I/O and Server Net and those networks including channel-based, switched fabric architecture which may become available as computer technology advances to provide scalable performance. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on the synchronization of multiple threads with a single thread of control in a simple data network having several example nodes (e.g., computers, servers and I/O units) interconnected by corresponding links and switches, although the scope of the present invention is not limited thereto.

Figure 1:
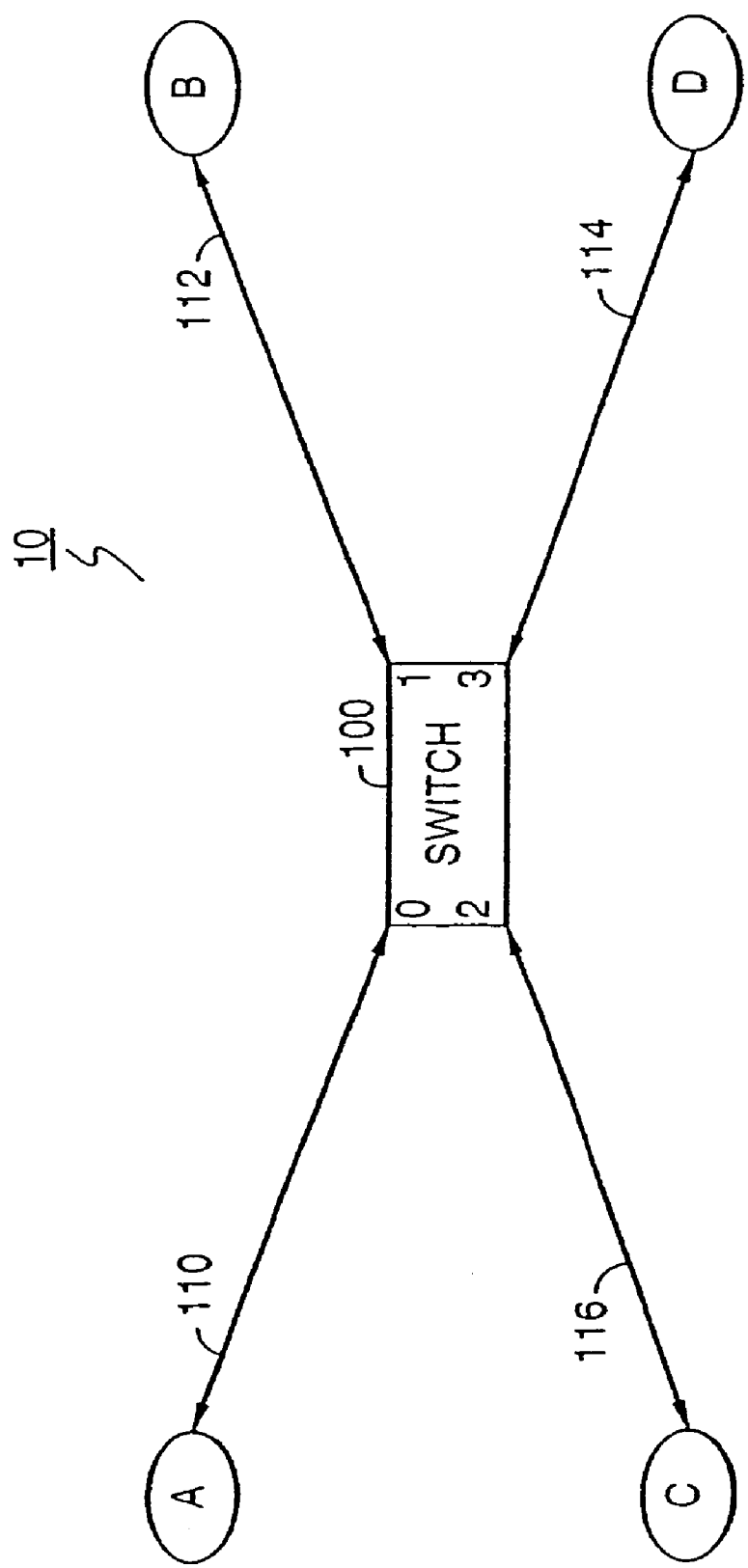
FIG. 1 illustrates an example data network having several nodes interconnected by corresponding links of a basic switch according to an embodiment of present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more I/O controllers connected thereto. Each I/O controller may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "*Next Generation Input/Output (NGIO) Specification*" as set forth by the NGIO Forum on Jul. 20, 1999. According to the NGIO Specification, the switch 100 may be an NGIO switched fabric (e.g., collection of links, switches and/or switch elements connecting a number of host systems and I/O units), and the endpoint may be a host system including one or more host channel adapters (HCAs), or a target system such as an I/O unit including one or more target channel adapters (TCAs). Both the host channel adapter (HCA) and the target channel adapter (TCA) may be broadly considered as fabric hardware adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO channel(s).

Figure 2:
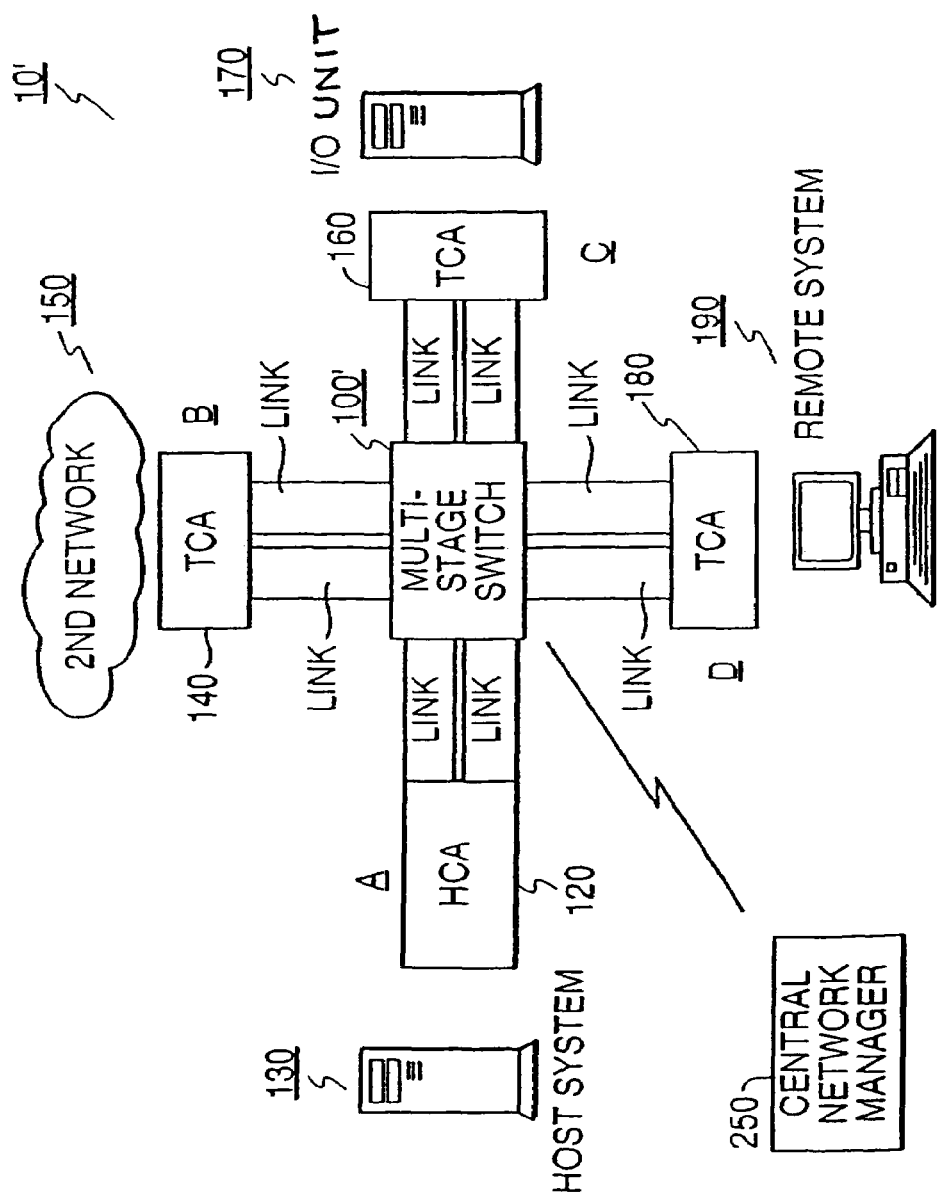
FIG. 2 illustrates another example data network having several nodes interconnected by corresponding links of a multi-stage switched fabric according to an embodiment of the present invention.

For example, FIG. 2 illustrates an example data network 10' using an NGIO architecture to transfer data from a source node to a destination node according to an embodiment of the present invention. As shown in FIG. 2, the data network 10' includes an NGIO fabric 100' (multi-stage switched fabric comprised of a plurality of switches) for allowing a host system and a remote system to communicate to a large number of other host systems and remote systems over one or more designated channels. A single channel may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any ones of remote systems. In addition, any number of end stations, switches and links may be used for relaying data in groups of cells between the end stations and switches via corresponding NGIO links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the multi-stage switched fabric 100' which serve as intermediate nodes between the host system 130 and the remote systems 150, 170 and 190.

The multi-stage switched fabric 100' may include a central network manager 250 connected to all the switches for managing all network management functions. However, the central network manager 250 may alternatively be incorporated as part of either the host system 130, the second network 150, the I/O unit 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the host system 130 and a multi-stage switched fabric 100' via high speed serial NGIO links. Similarly, target channel adapters (TCA) 140 and 160 may be used to provide an interface between the multi-stage switched fabric 100' and an I/O controller of either a second network 150 or an I/O unit 170 via high speed serial NGIO links. Separately, another target channel adapter (TCA) 180 may be used to provide an interface between a memory controller (not shown) of the remote system 190 and the multi-stage switched fabric 100' via high speed serial NGIO links. Both the host channel adapter (HCA) and the target channel adapter (TCA) may be broadly considered as fabric hardware adapters provided to interface either the host system 130 or any one of the target systems 150, 170 and 190 to the switched fabric, and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO channel(s). However, NGIO is merely one example embodiment or implementation of the present invention, and the invention is not limited thereto. Rather, the present invention may be applicable to a wide variety of any number of data networks, hosts and I/O units.

Figure 3:
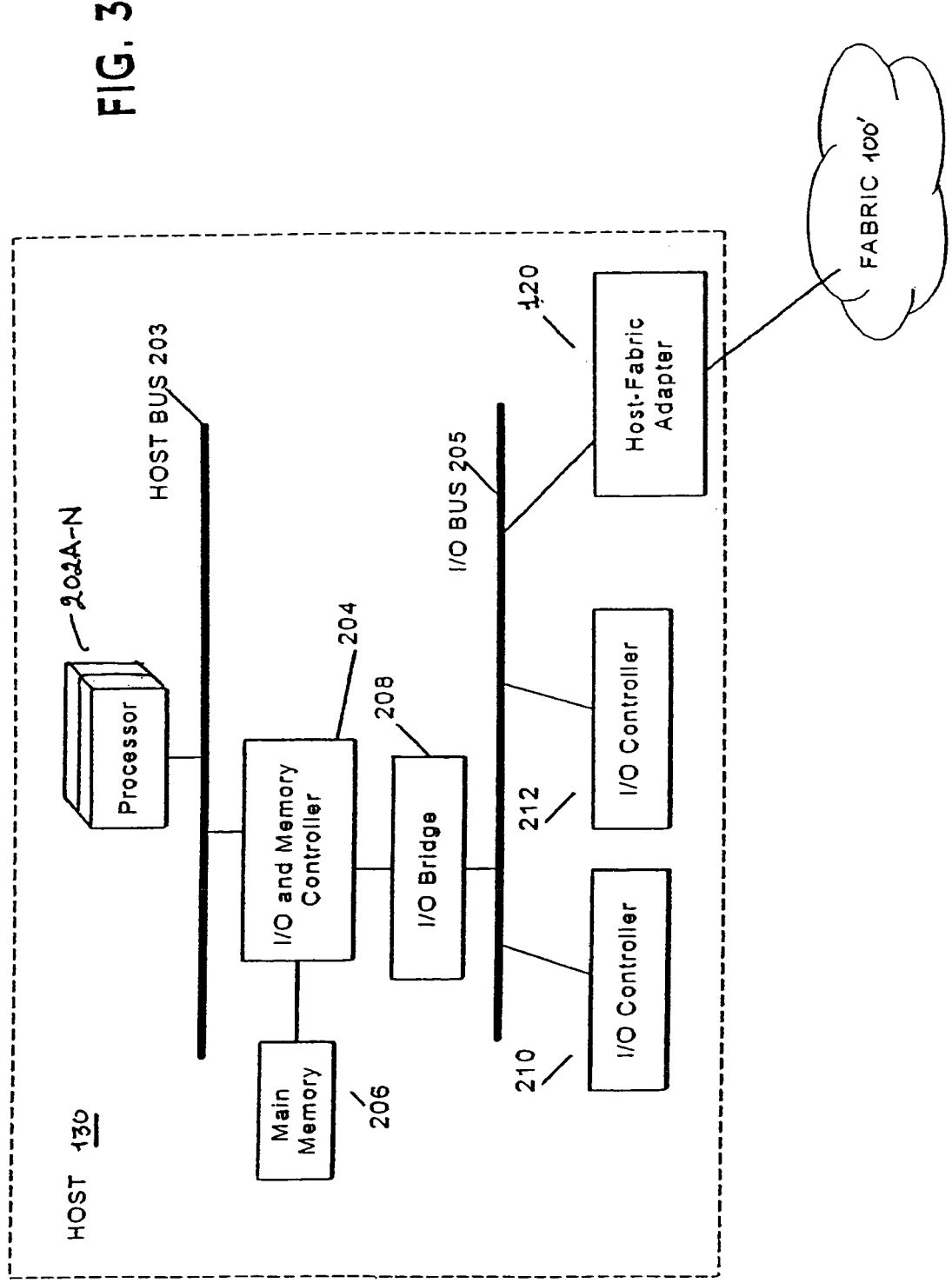
FIG. 3 illustrates a block diagram of a host system of an example data network according to an embodiment of the present invention.

One example embodiment of a host system 130 may be shown in FIG. 3. Referring to FIG. 3, the host system 130 may correspond to a multi-processor system, including one or more processors 202A–202N coupled to a host bus 203. Each of the multiple processors 202A–202N may access a shared resource and operate on a single item (I/O operation), and all of the multiple processors 202A–202N may concurrently access a shared resource and operate on multiple items (I/O operations) on a list at the same time. Examples of a shared resource may include, but are not limited to, an I/O and memory controller 204, a main memory 206, an I/O bridge 208, I/O controllers 210–212 and one or more host-fabric adapters 120. The I/O and memory controller 204 (or chipset) may be connected to the host bus 203. The main memory 206 may be connected to the I/O and memory controller 204. The I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4:
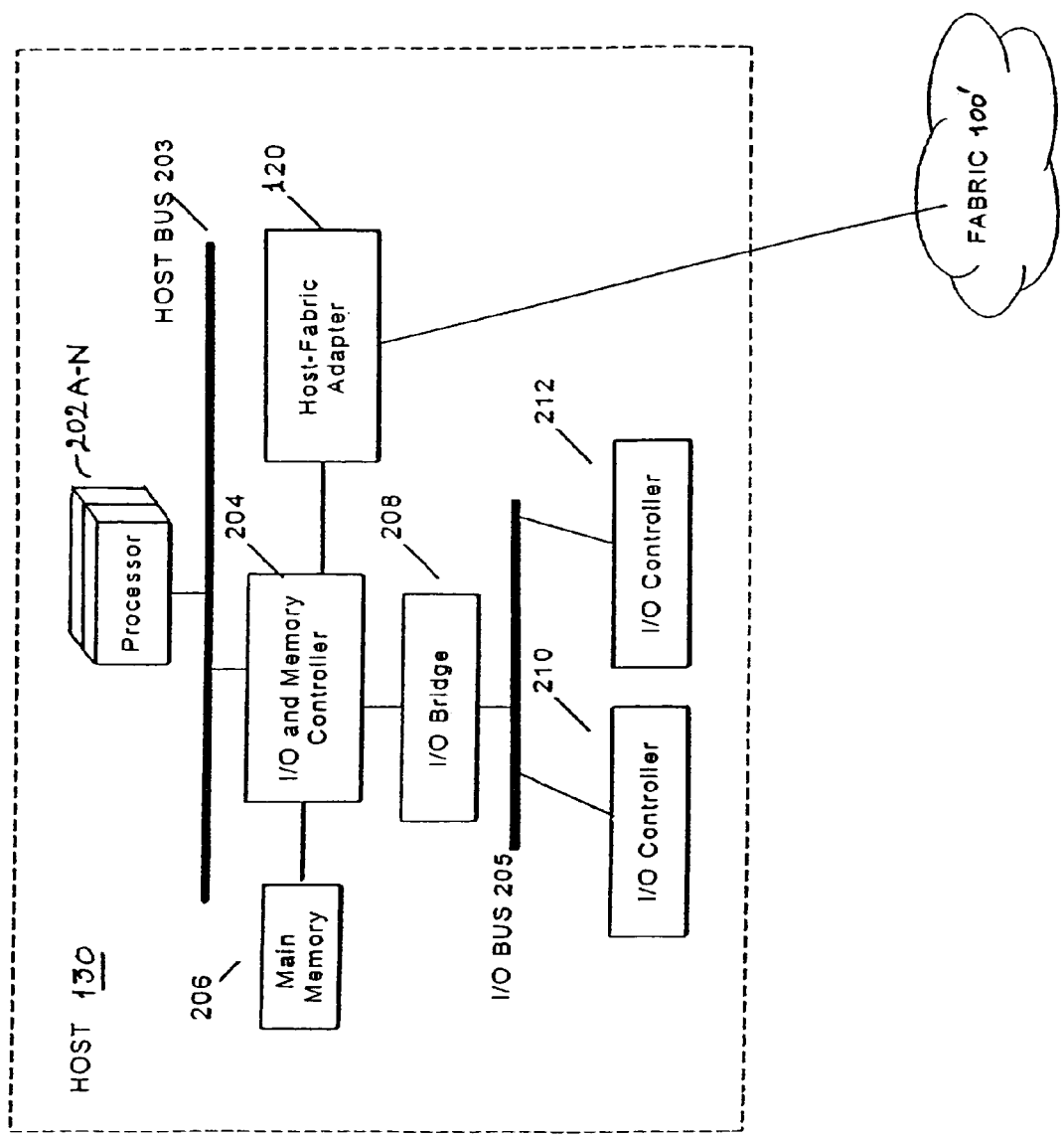
FIG. 4 illustrates a block diagram of a host system of an example data network according to another embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment, one or more host-fabric adapters 120 may be provided to interface the host system 130 to the multi-stage switched fabric 100'.

FIGS. 3–4 merely illustrate example embodiments of a host system 130. A wide array of system configurations of such a host system 130 may be available. Shared resources such as work queues and completion queues associated with a given hardware adapter of a host system may also be provided for mutual access by multiple processors. In addition, a software driver stack for the host-fabric adapter 120 may also be provided to allow the host system 130 to exchange data with one or more remote systems 150, 170 and 190 via the switched fabric 100', while preferably being compatible with many currently available operating systems, such as Windows 2000.

Figure 5:
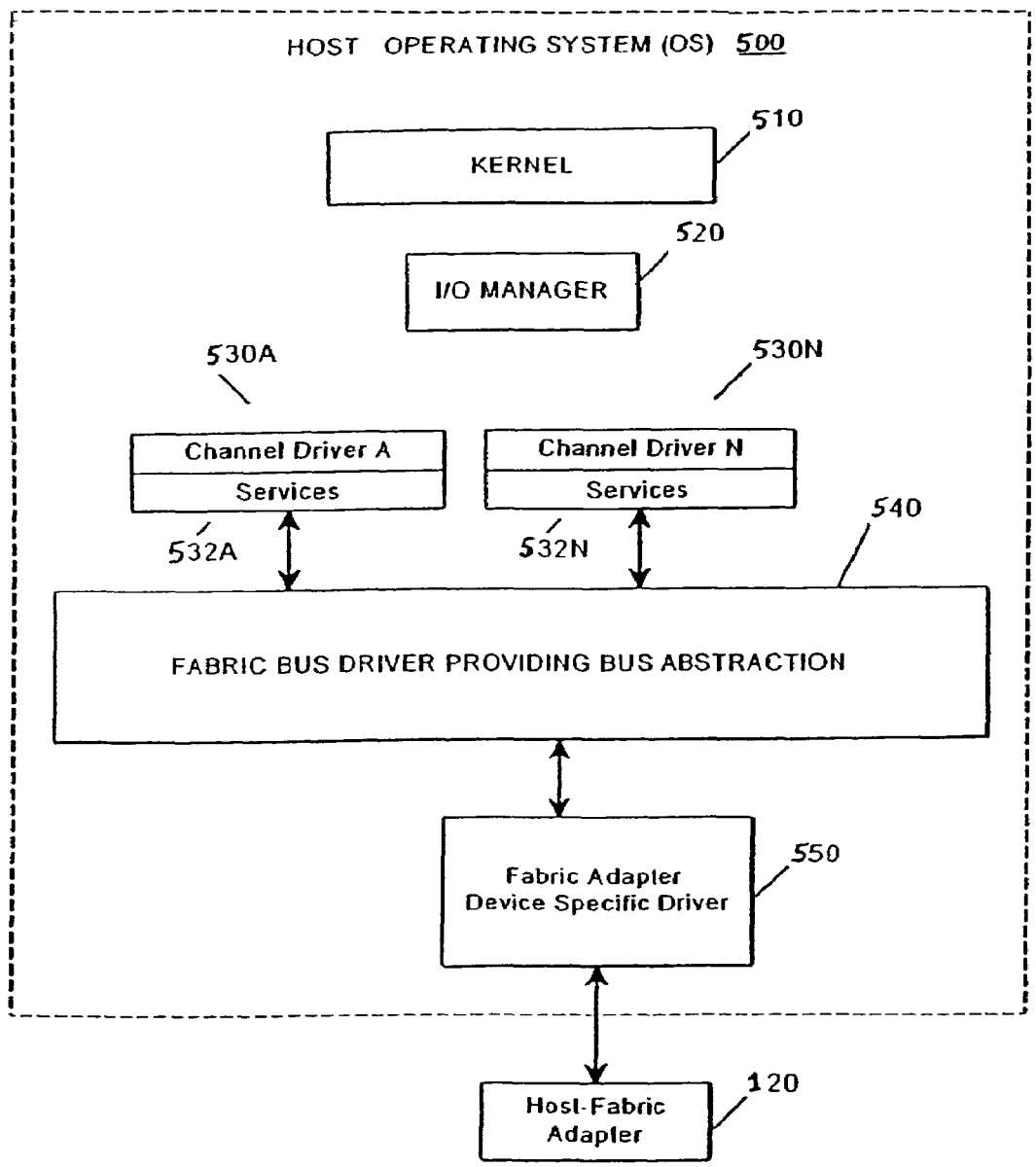
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N provided to interface various I/O controllers, and a host-fabric adapter software stack (driver module) including a fabric bus driver 540 and a fabric adapter device-specific driver 550 utilized to establish communication with a remote fabric-attached agent (e.g., I/O controller), and perform functions common to most drivers. Such a host operating system (OS) 500 may be Windows 2000 which may be commonly shared by all the processors 202A–202N of a host system 130, for example, and the I/O manager 520 may be a Plug-n-Play manager.

The host-fabric adapter software stack (driver module) may be provided to access the switched fabric 100' and information about fabric configuration, fabric topology and connection information. Such a host-fabric adapter software stack (driver module) may be utilized to perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*." For example, the HCA service layer (HSL) may be inherent to all channel drivers 530A–530N for providing a set of common fabric services in a service library, including connection services, resource services, and HCA services required by the channel drivers 530A–530N to instantiate and use NGIO channels for performing data transfers over the NGIO channels. The fabric bus driver 540 may correspond to the HCA abstraction layer (HCAAL) for managing all of the device-specific drivers, controlling shared resources common to all HCAs in a host and resources specific to each HCA in a host system 130, distributing event information to the HSL and controlling access to specific device functions. Likewise, the device-specific driver 550 may correspond to the HCA device-specific driver for providing an abstract interface to all of the initialization, configuration and control interfaces of an HCA.

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. NGIO and VI architectures support asynchronous data transfers between two memory regions, typically on different systems over one or more designated channels of a data network. Each system using a VI Architecture may contain work queues formed in pairs including a send queue and a receive queue in which requests, in the form of descriptors, are posted to describe data movement operation and location of data to be moved for processing and/or transportation via a NGIO switched fabric. The VI Specification defines VI mechanisms for low-latency, high-bandwidth message-passing between interconnected nodes connected by multiple logical point-to-point channels. Other architectures may also be used to implement the present invention.

In such a data network, NGIO and VI hardware and software may be used to support asynchronous data transfers between two memory regions, often on different systems via a switched fabric. Each system may serve as a source (initiator) system which initiates a message data transfer (message send operation) or a target system of a message passing operation (message receive operation). Each system may correspond to a multi-processor system including multiple processors each capable of processing an I/O completion on a different shared resource. Examples of such a multi-processor system may include, but are not limited to, host servers providing a variety of applications or services, and I/O units providing storage oriented and network oriented IO services. Likewise, examples of such a shared resource may include, but are not limited to, work queues and completion queues associated with a given hardware adapter of a host system using NGIO and VI architectures, and other memory elements such as first-in, first-out (FIFO) queues, buffers, hardware adapters and/or controllers of a host system. Requests for work (I/O operations) may be posted to a shared resource, the requested operation may then be performed. However, it is the responsibility of the system which initiates such a request to insure that a shared resource is in an appropriate state to do the work.

In order to improve the performance capabilities of software drivers on a multi-processor system, multiple threads of operation can concurrently initiate new I/O operations and process completed I/O operations on a shared resource (such as work queues, completion queues and other memory elements in a host system). The threads initiating and completing I/O operations check the state of the shared resource (work queue) before performing any work. Events such as descriptor errors, or a user request can cause a shared resource (work queue) to change states. Therefore care must be taken when changing the state of a shared resource (work queue) in order to prevent threads initiating and completing I/O operations from performing I/O operations on a shared resource (work queue) in an invalid state. Furthermore, any thread wishing to change the state of a shared resource (work queue) must be synchronized with all the threads processing I/O operations in order to maintain state integrity. Moreover, a shared resource (work queue) which may be simultaneously accessed by multiple threads can be compromised if not protected. Protection of such a shared resource (work queue) for simultaneous access by multiple threads may be achieved using a mutual exclusion lock. When any thread holds the lock, other threads trying to acquire the same lock may be blocked until the lock is available. However, mutual exclusion locks are not suitable for synchronizing multiple threads with a single thread of control since such a lock forces strict serialization of all the threads—only a single thread of control can run at any given time.

Figure 6A:
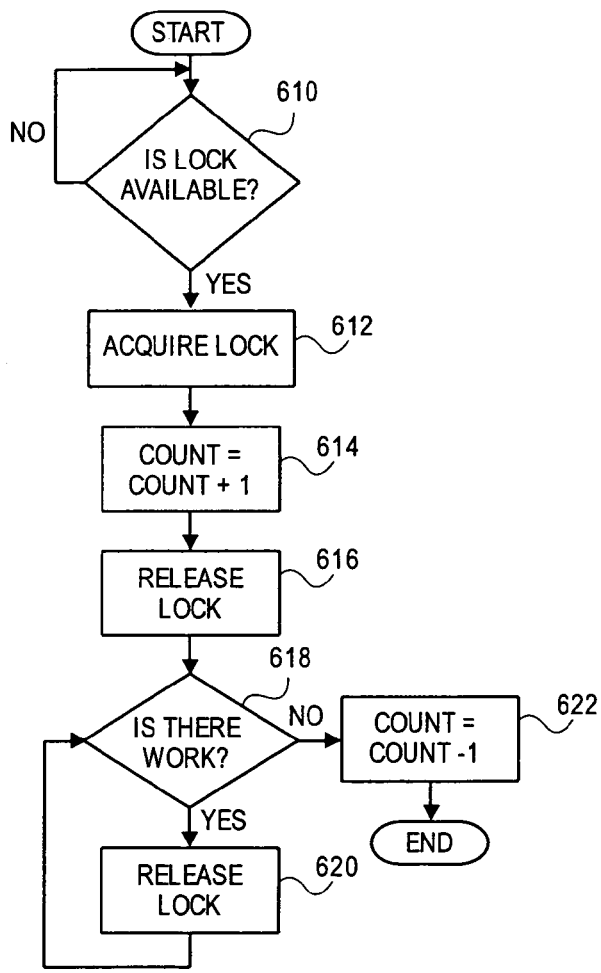
FIGS. 6A–6B illustrate an example synchronization algorithm installed in kernel-level device drivers of an operating system (OS) or user-level applications of a host system for synchronizing a single thread of control with a group of threads according to an embodiment of the present invention.
Figure 6B:
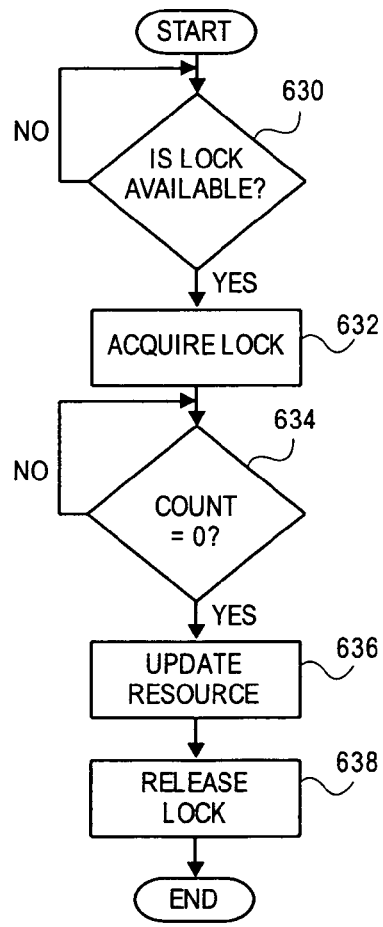

Turning now to FIGS. 6A–6B, in which an example synchronization algorithm installed in a host system for synchronizing a single thread of control with a group of threads according to an embodiment of the present invention is illustrated. The synchronization algorithm may be installed in the software driver module of an operating system (OS) kernel as part of services provided by the service library (see FIG. 5, channel drivers 530A–530N), or installed as part of an user-level application of a host system 130 (see FIGS. 2–4) which manages simultaneously I/O operations on shared resources (work queues) while at the same time supporting state changes on those shared resources (work queues). Alternatively, such a synchronization algorithm may also be available as a firmware module or a comprehensive hardware/software module.

Also, similarly to the software driver module, the synchronization algorithm may also be independently provided on a computer tangible medium, it includes a computer readable storage medium and a transmission medium, the storage media such as memory devices; magnetic disks (fixed, floppy, and removable); other magnetic media such as magnetic tapes; optical media such as CD-ROM disks, or via the transmission medium such as Internet downloads, which may be available for a user to conveniently plug-in or download into an existing operating system (OS). The synchronization algorithm may operate to allow a group of threads concurrently accessing a shared resource (work queue) to operate in exclusion of a single thread.

The following pseudo-code as shown in the below TABLE may describe the operations followed to achieve mutual exclusion between multiple threads processing I/O operations on a shared resource (work queue) and a single thread changing the state of a shared resource (work queue) without requiring strict serialization of all threads.

| PSEUDO-CODE TABLE | |
| --- | --- |
| Worker (Operation) Threads | Update (State Change) Thread |
| // Acquire the lock to the list. This serializes with the update thread.<br>List.Lock( );<br>InterlockedIncrement( &Count );<br>List.Unlock( );<br>// Check all work queues for completions.<br>for( i = 0; i < List.Count( ); i++ )<br>{<br>  // Get a reference to an item on the list. pListItem = List.GetItemAt ( i );<br><br>  // Process the item.<br>  pListItem->Process( );<br>}<br>InterlockedDecrement( &Count ). | // Acquire the lock to the list.<br>List.Lock( );<br><br>// Wait until there are no more threads accessing the list.<br>while( Count )<br>  ; // do nothing but wait<br><br>// Add the new item to the list<br>List.Insert( ListItem );<br><br><br>// Release the lock to allow the worker threads to continue;<br>List.Unlock( ). |

As shown in the above TABLE, the pseudo-code for the synchronization algorithm may comprise two functional components: worker (I/O operation) threads which perform on shared resources, that is, to operate on items in the list of shared resources (such as work queues); and an update (state change) thread which performs state changes (such as idle, active and removal states) of a shared resource, that is, to update the list of shared resources (work queues). Worker (I/O operation) threads are multiple components which may occur frequently and simultaneously if multiple components exist to allow parallel I/O completion processing. Each worker (I/O operation) thread may be invoked by an event such as connection and error events and I/O completion events, or by a user's request. In contrast to worker threads, an update (state change) thread is a single component which may occur occasionally during worker thread operations, and may be invoked by a user to update the list of shared resources (such as work queues or completion queues that need to be checked for completions). Both the worker (I/O operation) threads and the update (state change) may operate concurrently. Therefore, a single update (state change) thread need to be synchronized with multiple worker (I/O operation) threads so as to allow a group of threads to process I/O completions simultaneously and reduce expensive serialization routines. Such a pseudo-code need not be software specific, and may be implemented using high-level programming languages such as C, C++ and Visual Basic as part of the software driver module of an operating system (OS) kernel or an user-level application of a host system 130 (see FIGS. 2–4).

In general, when the state of a shared resource (work queue) is not changing during normal operation, all threads performing I/O operations on the shared resource (work queue) may serialize their operation only to increment the count of threads processing I/O operations. This allows the threads to perform work concurrently while processing I/O operations. The count of threads processing I/O operations is non-zero, when any Worker (I/O Operation) Thread is running. Each thread may decrement the count variable when it is done processing I/O operations. When the count reaches zero (0), no threads are processing I/O operations, and therefore, it is safe for the state of the shared resource (work queue) to change. Consequently, any thread wishing to update or change the state of the shared resource (work queue) may acquire the lock, preventing new Worker (I/O Operation) Threads from processing I/O operations. Once the state of a shared resource (work queue) is changed, the Update (State Change) Thread releases the lock, thereby releasing all blocked Worker (I/O Operation) Threads.

As shown in FIG. 6A, an example worker thread operation of the synchronization algorithm according to an embodiment of the present invention will be described as follows. At block 610, each worker thread determines whether a lock is available when invoked by either an event or a user's request. If the lock is not available, then the worker thread remains waiting until the lock becomes available at block 610. However, if the lock is available, the worker thread acquires such a lock at block 612, increments the count by a discrete constant (such as Count=Count+1) at block 614, and then releases such a lock after the count has been incremented at block 616. The software count may be utilized to record the number of worker threads which are active.

Once the lock has been released, multiple threads may now be allowed to process work (such as connection and error events and I/O completion events) concurrently with the single thread during a processing stage. For example, five (5) or eight (8) worker threads may perform work concurrently. The worker thread next determines whether there is work to be processed at block 618. If there is work to be processed, the worker thread proceeds to process the work until there is no work to be processed at block 620. However, if there is no work to be processed at block 618, the worker thread decrements the count by a discrete constant (such as Count=Count−1) at block 622. The software count may be utilized by an update thread to determine when all the worker threads are done with I/O completion processing. The update thread cannot change the state of the shared resource as long as any one of the worker threads is busy processing work. The software count used by the worker thread to increment at block 614 and to decrement at block 622 may be interlocked for purposes of releasing the lock for multiple worker threads to process work.

As shown in FIG. 6B, an example update thread operation of the synchronization algorithm according to an embodiment of the present invention will be described as follows. At block 630, an update thread determines whether a lock is available when invoked by the user performing I/O operations. If the lock is not available, then the update thread remains waiting until the lock becomes available at block 630. Such a lock may become available when released by any one of the worker threads as shown in FIG. 6A. However, if the lock is available, the update thread grabs such a lock at block 632. While holding the lock, the update thread checks the count until the count becomes zero (0) at block 634. The software count needs to be zero (0) for the update thread to update or change the state of a shared resource since the software count represents the number of worker threads that are active. The shared resources, such as work queues maintained in a list that need to be checked for completions, can be updated only if there is no active worker threads. If, for example, the count is one (1) indicating that there is an active worker thread, the update thread then remains waiting until the active worker thread has processed work and the count has become zero (0). The software count may be initialized as zero (0) by the synchronization algorithm independently from either the worker thread operation shown in FIG. 6A, or the update thread operation shown in FIG. 6B.

When the count becomes zero (0) at block 634, the update thread may now proceed to update or change the state of a shared resource at block 636. After the shared resource has been updated, the update thread then releases the lock at block 638 so as to allow either new worker threads to continue I/O operation processing or a different update thread to continue shared resource updating. The update thread operation may be completely serialized, whereas the worker thread operation may be serialized only when incrementing the count, and when the count has been incremented, all worker threads operate in parallel to process the work.

As described from the foregoing, the synchronization algorithm and mechanism according to an embodiment of the present invention advantageously supports synchronizing multiple threads of operation with a single thread and allows a group of threads to process completed I/O operations simultaneously while reducing expensive serialization routines to provide better system performance.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO) and Future I/O (FIO) and Server Net, and a LAN system including Ethernet, FDDI (Fiber Distributed Data Interface) Token Ring LAN, Asynchronous Transfer Mode (ATM) LAN, Fiber Channel, and Wireless LAN. More importantly, hardware equivalence may be implemented in lieu of software-based synchronization routines for synchronizing multiple threads of control with a single thread. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A system comprising:
   a shared resource;
   multiple processors arranged to access said shared resource; and
   an operating system configured to allow said multiple processors to perform work on said shared resource concurrently while supporting state changes or updates of said shared resources, said operating system comprising a synchronization algorithm for synchronizing multiple worker threads of operation with a single thread so as to achieve mutual exclusion between multiple worker threads performing work on said shared resource and a single update thread updating or changing the state of said shared resource without requiring serialization of all threads such that an update or change of the state of the shared resource may be made by the single update thread only when none of the multiple worker threads are processing work on the shared resource, wherein the multiple worker threads are able to perform work on the shared resource concurrently.

2. The system as claimed in claim 1, wherein said shared resource includes work queues associated with a hardware adapter configured to send and receive message data to/from a remote system.

3. The system as claimed in claim 2, wherein said synchronization algorithm is executed to synchronize any update thread wishing to update or change a state of said shared resource with all the worker threads processing I/O operations on said shared resource.

4. The system as claimed in claim 1, wherein said synchronization algorithm is executed to allow worker threads to work concurrently while processing I/O operations in exclusion of an update thread when a state of said shared resource is not changing, and allow an update thread to change the state or update said shared resource in exclusion of multiple worker threads.

5. The system as claimed in claim 4, wherein said synchronization algorithm is executed to support a worker thread operation for processing simultaneous I/O operations on said shared resource while concurrently supporting an update thread operation for updating or changing the state of said shared resource.

6. The system as claimed in claim 5, wherein said worker thread operation is invoked by one of an event and a user's request, and is performed by:
determining whether a lock is available;
if the lock is not available, waiting until the lock becomes available;
if the lock is available, seizing the lock while incrementing a count by a discrete constant to indicate the number of worker threads that are active, and then releasing the lock after the count has been incremented;
after the lock has been released, allowing multiple worker threads to process work concurrently;
determining next whether there is work to be processed;
if there is work to be processed, processing the work until there is no work to be processed; and
if there is no work to be processed, decrementing the count by a discrete constant to indicate when all the worker threads are done with completion processing.

7. The system as claimed in claim 6, wherein said update thread operation is invoked by a user's request, and is performed by:
determining whether a lock is available;
if the lock is not available, waiting until the lock becomes available when released by any one of the worker threads;
if the lock is available, seizing the lock until the count becomes zero (0) to indicate that it is safe to update or change the state of said shared resource, and updating or changing the state of said shared resource; and
after said shared resource has been updated, releasing the lock so as to allow either new worker threads to continue I/O operation processing or a different update thread to continue shared resource updating.

8. The system as claimed in claim 2, further comprising data channels formed between said system and said remote system, via a switched fabric, and supported for message data transfers between said system and said remote system.

9. The system as claimed in claim 2, wherein said synchronization algorithm is installed as part of a software driver module of an operating system (OS) kernel or an user-level application of said system.

10. The system as claimed in claim 2, wherein said shared resource includes ones of work queues, completion queues, FIFO queues, hardware adapters, I/O controllers and other memory elements of said system.

11. A network, comprising:
a switched fabric;
remote systems attached to said switched fabric; and
a host system comprising multiple processors; a host-fabric adapter provided to interface with said switched fabric and included work queues each configured to send and receive message data from a single remote system, via said switched fabric; and an operating system configured to allow said multiple processors to perform work on said work queues concurrently while supporting state changes of said work queues, said operating system comprising a synchronization algorithm for synchronizing multiple worker threads of operation with a single update thread so as to achieve mutual exclusion between multiple worker threads performing work on said work queues and a single update thread changing the state of said work queues without requiring serialization of all threads such that an update or change of the state of the work queues may be made by the single update thread only when none of the multiple worker threads are processing work on the work queues, wherein the multiple worker threads are able to perform work on the shared resource concurrently.

12. The network as claimed in claim 11, wherein said synchronization algorithm is executed to synchronize any update thread wishing to update or change a state of said work queues with all the worker threads processing I/O operations on said work queues.

13. The network as claimed in claim 11, wherein said synchronization algorithm is executed to allow worker threads to work concurrently while processing I/O operations in exclusion of an update thread when the state of said work queues is not changing, and allow an update thread to change the state or update said work queues in exclusion of multiple worker threads.

14. The network as claimed in claim 11, wherein said synchronization algorithm is executed to support a worker thread operation for processing simultaneous I/O operations on said work queues while concurrently supporting an update thread operation for updating or changing the state of said work queues.

15. The network as claimed in claim 14, wherein said worker thread operation is invoked by one of an event and a user's request, and is performed by:
determining whether a lock is available;
if the lock is not available, waiting until the lock becomes available;
if the lock is available, seizing the lock while incrementing a count by a discrete constant to indicate the number of worker threads that are active, and then releasing the lock after the count has been incremented;
after the lock has been released, allowing multiple worker threads to process work concurrently;
determining next whether there is work to be processed;
if there is work to be processed, processing the work until there is no work to be processed; and
if there is no work to be processed, decrementing the count by a discrete constant to indicate when all the worker threads are done with completion processing.

16. The network as claimed in claim 14, wherein said update thread operation is invoked by a user's request, and is performed by:

determining whether a lock is available;

if the lock is not available, waiting until the lock becomes available when released by any one of the worker threads without any work to be processed;

if the lock is available, seizing the lock until the count becomes zero (0) to indicate that it is safe to update or change the state of said shared resource, and updating or changing the state of said work queues; and after said work queues have been updated, releasing the lock so as to allow either new worker threads to continue I/O operation processing or a different update thread to continue work queue updating.

17. The network as claimed in claim 11, further comprising data channels formed between said host system and said remote systems, via said switched fabric, and supported for message data transfers between said host system and said remote systems.

18. The network as claimed in claim 11, wherein said synchronization algorithm is installed as part of a software driver module of an operating system (OS) kernel or an user-level application of said host system.

19. The network as claimed in claim 11, wherein said host system and said remote systems represent channel endpoints of a data network and data channels formed between said host system and said remote systems, via said switched fabric, are supported for message data transfers between said host system and said remote systems.

20. A process of synchronizing an update thread which updates a list of work queues with multiple worker threads which operate on items in the list of work queues in a multi-processor system, comprising:

allowing a group of worker threads to concurrently access the list of work queues to process I/O operations in exclusion of an update thread, when states of the work queues are not changing;

incrementing a count of threads processing I/O operations each time a worker thread is running, while decrementing the count of threads processing I/O operations each time a worker thread is done processing I/O operations;

when the count of threads reaches a designated value indicating that no worker threads are running, allowing an update thread to access and update the list of work queues in exclusion of new worker threads from processing I/O operations; and after the list of work queues is updated, allowing new worker threads to perform I/O operations until all worker threads are done processing I/O operations.

21. A computer-readable storage medium that stores computer-executable instructions for synchronizing an update thread which updates a list of work queues with a group of threads which operate on items in the list of work queues in a multi-processor system, said computer-executable instructions causing said multi-processor system to:

permit a group of worker threads to concurrently access the list of work queues to process I/O operations in exclusion of an update thread, when states of the work queues are not changing;

increment a count of threads processing I/O operations each time a worker thread is running, while decrementing the count of threads processing I/O operations each time a worker thread is done processing I/O operations;

permit a single update thread to access and update the list of work queues in exclusion of new worker threads from processing I/O operations, when the count of threads reaches a designated value indicating that no worker threads are running; and after the list of work queues is updated, permit new worker threads to perform I/O operations until all worker threads are done processing I/O operations.

* * * * *